United States Patent
Cumoli et al.

(10) Patent No.: US 11,430,148 B2
(45) Date of Patent: Aug. 30, 2022

(54) APPARATUS AND METHOD FOR PALLET VOLUME DIMENSIONING THROUGH 3D VISION CAPABLE UNMANNED AERIAL VEHICLES (UAV)

(71) Applicant: Datalogic IP Tech S.r.l., Bologna (IT)

(72) Inventors: Marco Cumoli, Monte San Pietro (IT); Francesco D'Ercoli, Bologna (IT); Michele Gruppioni, Sala Bolognese (IT); Nicola Fioraio, Modena (IT)

(73) Assignee: Datalogic IP Tech S.r.l., Calderara di Reno (IT)

( * ) Notice: Subject to any disclaimer, the term of this patent is extended or adjusted under 35 U.S.C. 154(b) by 393 days.

(21) Appl. No.: 15/393,082

(22) Filed: Dec. 28, 2016

(65) Prior Publication Data

US 2018/0178667 A1 Jun. 28, 2018

(51) Int. Cl.
*G06T 7/70* (2017.01)
*B64C 39/02* (2006.01)
*G05D 1/00* (2006.01)
*G06T 7/62* (2017.01)
(Continued)

(52) U.S. Cl.
CPC .............. *G06T 7/70* (2017.01); *B60L 53/36* (2019.02); *B64C 39/024* (2013.01); *G05D 1/0094* (2013.01); *G06T 7/62* (2017.01); *G06T 7/73* (2017.01); *B64C 2201/123* (2013.01); *B64C 2201/141* (2013.01); *G06T 2207/10028* (2013.01); *G06T 2207/30204* (2013.01); *G06T 2207/30208* (2013.01);
(Continued)

(58) Field of Classification Search
None
See application file for complete search history.

(56) References Cited

U.S. PATENT DOCUMENTS

| 8,587,583 | B2 | 11/2013 | Newcombe et al. |
| 9,102,055 | B1 * | 8/2015 | Konolige ................. B25J 9/163 |
| 10,614,579 | B1 * | 4/2020 | Kwon ........................ G06T 7/30 |

(Continued)

FOREIGN PATENT DOCUMENTS

| CN | 203772269 U | 8/2014 |
| CN | 104880149 A | 9/2015 |

(Continued)

OTHER PUBLICATIONS https://www.accuware.com/blog/visual-indoor-navigation (Year: 2016).*
(Continued)

*Primary Examiner* — Peter D Nolan
*Assistant Examiner* — Michael F Whalen
(74) *Attorney, Agent, or Firm* — Foley & Lardner LLP (57) ABSTRACT

A system and method for measuring volume dimensions of objects may include flying a UAV to measuring points around an object within a defined area. Images of the object may be captured by the UAV at each of the measuring points. The captured images may be communicated by the UAV to a computing device remotely positioned from the UAV. Volume dimensions of the object may be computed based on the captured images. The volume dimensions of the object may be presented. In presenting the volume dimensions, the volume dimensions may be presented to a user via an electronic display.

28 Claims, 11 Drawing Sheets

(51) Int. Cl.
  *G06T 7/73* (2017.01)
  *B60L 53/36* (2019.01)
(52) U.S. Cl.
  CPC .............. *G06T 2207/30241* (2013.01); *G06T 2207/30244* (2013.01); *G06T 2207/30248* (2013.01)

(56) References Cited

U.S. PATENT DOCUMENTS

| | | | |
|---|---|---|---|
| 2014/0336928 A1* | 11/2014 | Scott | G01N 21/88 701/468 |
| 2015/0250137 A1* | 9/2015 | Palsgaard | A01K 5/00 119/57.92 |
| 2016/0133019 A1* | 5/2016 | Wagner | G01C 11/02 348/144 |
| 2016/0163067 A1* | 6/2016 | Williams | G01B 11/00 382/154 |
| 2016/0253808 A1* | 9/2016 | Metzler | G06T 17/05 382/103 |
| 2016/0271796 A1* | 9/2016 | Babu | G05D 1/0094 |
| 2016/0314593 A1* | 10/2016 | Metzler | G06T 7/579 |
| 2016/0330402 A1* | 11/2016 | Benetti | B25J 9/1676 |
| 2017/0038779 A1* | 2/2017 | Fujimori | B66F 9/07504 |
| 2017/0067734 A1* | 3/2017 | Heidemann | G01B 11/2545 |
| 2017/0090477 A1* | 3/2017 | Akselrod | G01C 21/206 |
| 2017/0150129 A1* | 5/2017 | Pangrazio | H04N 5/247 |
| 2017/0221241 A1* | 8/2017 | Hannah | B64C 39/024 |
| 2017/0228885 A1* | 8/2017 | Baumgartner | G01B 11/04 |
| 2017/0336195 A1* | 11/2017 | Suzuki | G01B 11/022 |
| 2017/0336806 A1* | 11/2017 | Blanc-Paques | G08G 5/045 |
| 2017/0369184 A1* | 12/2017 | Di Benedetto | B64F 1/00 |
| 2018/0038805 A1* | 2/2018 | Heikkila | G01B 11/30 |
| 2018/0086456 A1* | 3/2018 | Burch | G06K 7/1413 |
| 2018/0114340 A1* | 4/2018 | Kopelke | G06T 7/74 |
| 2018/0139431 A1* | 5/2018 | Simek | H04N 5/2258 |
| 2018/0143312 A1* | 5/2018 | High | G01C 21/206 |
| 2018/0174325 A1* | 6/2018 | Fu | G06T 7/75 |
| 2018/0231972 A1* | 8/2018 | Woon | G05D 1/104 |
| 2018/0262674 A1* | 9/2018 | Iwakura | B64D 17/00 |
| 2018/0288364 A1* | 10/2018 | Virhia | G11B 27/34 |
| 2018/0319594 A1* | 11/2018 | Blevins | B66F 9/087 |
| 2018/0352735 A1* | 12/2018 | Balutis | G05D 1/0011 |
| 2018/0356841 A1* | 12/2018 | Zilberstein | B64D 1/16 |
| 2019/0276146 A1* | 9/2019 | Koivuranta | B64C 39/024 |
| 2020/0209891 A1* | 7/2020 | Gusikhin | B64C 39/024 |

FOREIGN PATENT DOCUMENTS

| | | |
|---|---|---|
| CN | 105844695 A | 8/2016 |
| EP | 3062066 A1 | 8/2016 |
| EP | 3086283 A1 | 10/2016 |
| WO | 2015035428 A2 | 3/2015 |

OTHER PUBLICATIONS

Bylow, Erik, et al., "Real-Time Camera Tracking and 3D Reconstruction Using Signed Distance Functions," Center for Mathematical Sciences, Lund University, Lund, Sweden, 11 pages.

Kerl, Christian, et at., "Robust Odometry Estimation for RGB-D Cameras," 8 pages.

Fioraio, Nicola et al., "Large-Scale and Drift-Free Surface Reconstruction Using Online Subvolume Registration," Computer Vision Foundation, 2015; pp. 4475-4483.

Klein, Georg, et al., "Parallel Tracking and Mapping on a Camera Phone," Active Vision Laboratory, University of Oxford, 4 pages.

Schops, Thomas, et al., "Semi-Dense Visual Odometry for AR on a Smartphone," Technische Universitat Munchen, 6 pages.

Steinbrucker, Frank, et al., "Large-Scale Multi-Resolution Surface Reconstruction from RGB-D Sequences," Technical University of Munich, pp. 3264-3271.

Lee Kian Seng et al. "Autonomous Patrol and Surveillance System Using Unmanned Aerial Vehicles", 2015 IEEE 15th International Conference on Environment and Electrical Engineering (EEEIC), IEEE, Jun. 10, 2015 (Jun. 10, 2016), pp. 1291-1297.

Yohanes et al. "A system of UAV Application in Indoor Environment", Production and Manufacturing Research, vol. 4, No. 1, Jan. 21, 2016 (Jan. 21, 2016), pp. 2-22.

European Search Report corresponding to European Patent Application No. EP17210766.6, dated Jun. 1, 2018, 11 pages.

* cited by examiner

APPARATUS AND METHOD FOR PALLET VOLUME DIMENSIONING THROUGH 3D VISION CAPABLE UNMANNED AERIAL VEHICLES (UAV)

BACKGROUND

Typical systems developed for pallet volume dimensioning (volume measuring of cargo positioned on the pallets) are designed in order to work on multiple static objects placed under a laser measurement system. Very precise measurements can be achieved by increasing scan time of the objects and by using multiple laser scanners or cameras. Consolidated solutions available in the market have limitations, which are mainly related to maintenance. Maintenance of pallet volume dimensioning solutions generally includes laser degradations, head replacements, moving parts maintenance, electromechanical driver replacements and maintenance, and so forth.

Another problem with existing pallet volume dimensioning systems are bulky sizes of the systems, which include large frames, drivers, motors, extender arms with multiple laser scanners or cameras, and other moving parts that may wear out. In some cases, the frames are moved during a scanning process. Moreover, existing systems are fairly expensive for the customer to purchase and maintain. As an example, it is estimated that about $50,000 or more is needed simply to perform the volume dimensioning measurements, which does not include weighing the cargo and reading barcodes affixed to the cargo.

Accordingly, there is a need to reduce cost and size of pallet volume dimensioning systems and maintenance thereof, while maintaining or improving accuracy and functionality.

SUMMARY

To reduce cost, complexity, and maintenance of pallet volume measurement systems, an autonomous unmanned aerial vehicle (UAV) or drone configured to performing measurements and optionally read machine readable indicia (e.g., barcodes, QR codes, text, etc.) and other identifiers (e.g., hazmat symbols) may be utilized. The UAV may be configured with minimal computational power and simplistic positioning capabilities, thereby reducing complexity and cost of the UAV. In an embodiment, the UAV may be configured with a 3D or stereoscopic camera so as to capture 3D images to enable accurate measurements of objects on a pallet to be taken.

One embodiment of a method for measuring volume dimensions of objects may include flying a UAV to measuring points around an object within a defined area. Images of the object may be captured by the UAV at each of the measuring points. The captured images may be communicated by the UAV to a computing device remotely positioned from the UAV. Volume dimensions of the object may be computed based on the captured images. The volume dimensions of the object may be presented. In presenting the volume dimensions, the volume dimensions may be presented to a user via an electronic display.

One embodiment of a system for measuring volume dimensions of objects may include a defined area within which a load on a pallet is to be imaged for determining volume dimensions. A computing device, such as a workstation may be utilized. A UAV may be configured to fly to measuring points around an object within the defined area. The UAV may include a (i) camera, (ii) processing unit, and (iii) input/output (I/O) unit. The UAV may be configured to capture images of the object using the camera at each of the measuring points, and communicate the captured images via the I/O unit to the computing device remotely positioned from the UAV. The computing device may be configured to compute volume dimensions of the object based on the captured images, and present the volume dimensions of the object.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
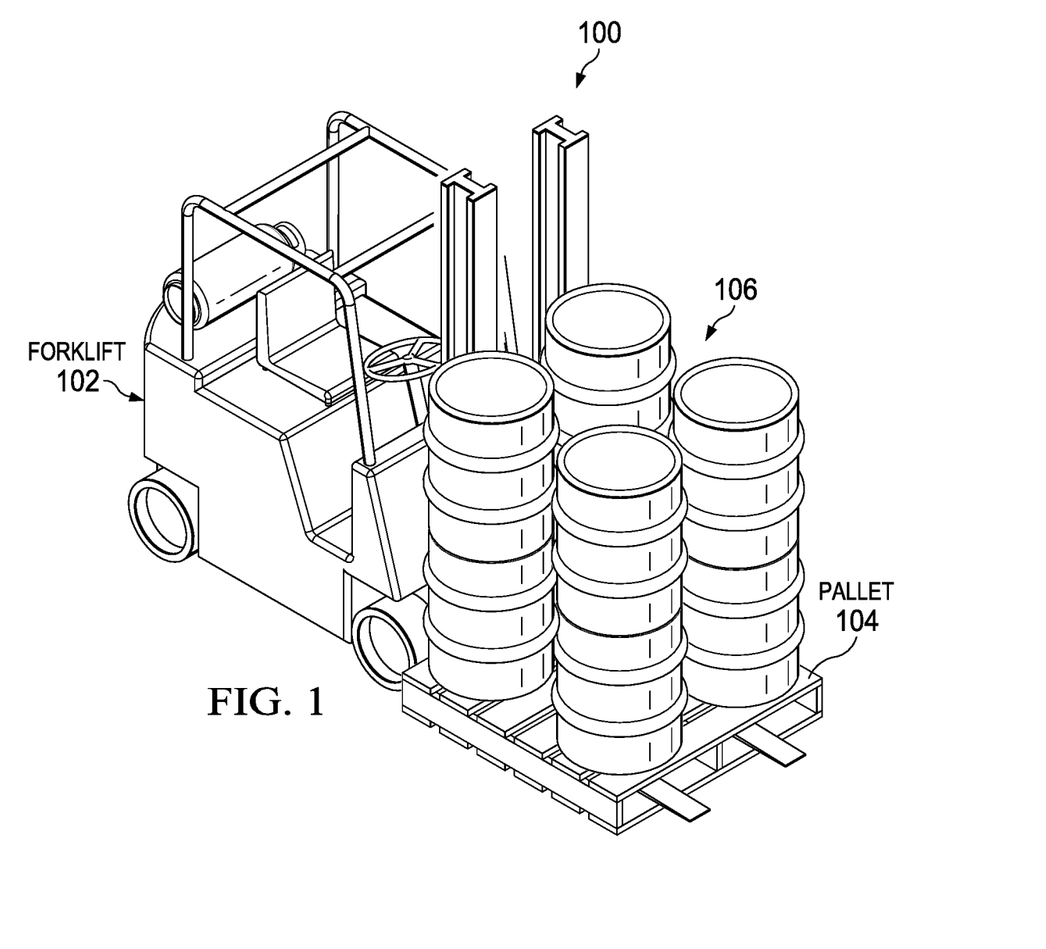
FIG. 1 is an illustration of an illustrative scene in which a forklift transporting a pallet on which a load is positioned.
Figure 2A:
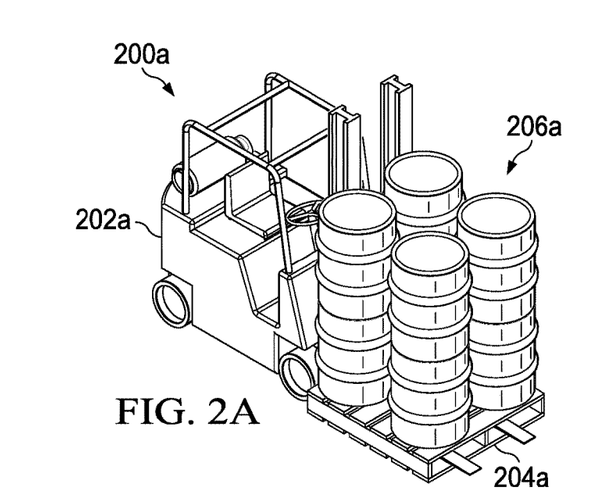
FIGS. 2A-2D is an illustration of an illustrative set of forklifts transporting pallets on which different sized and shaped loads are positioned.
Figure 2B:
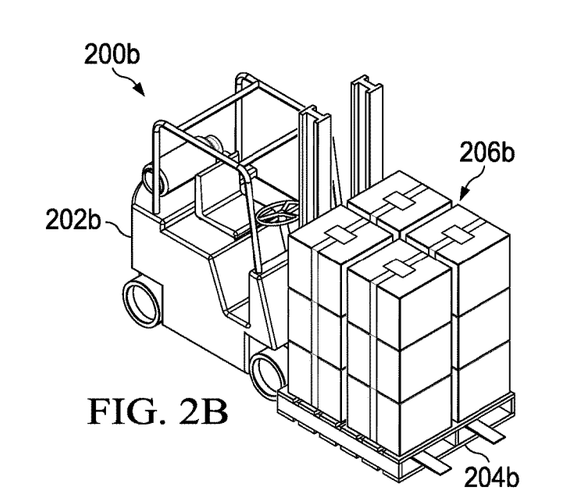
Figure 2C:
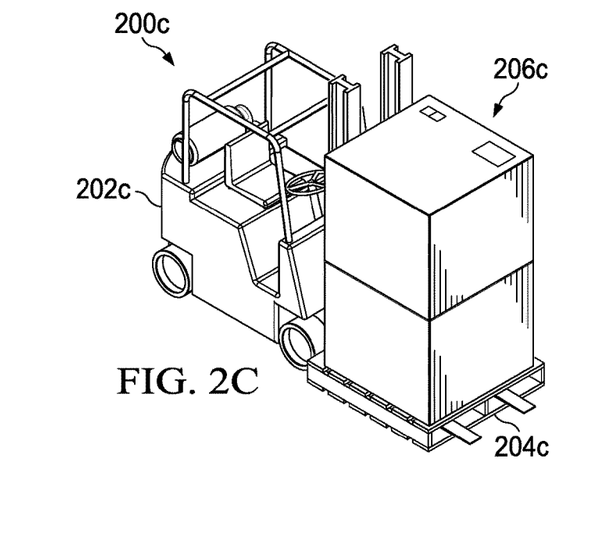
Figure 2D:
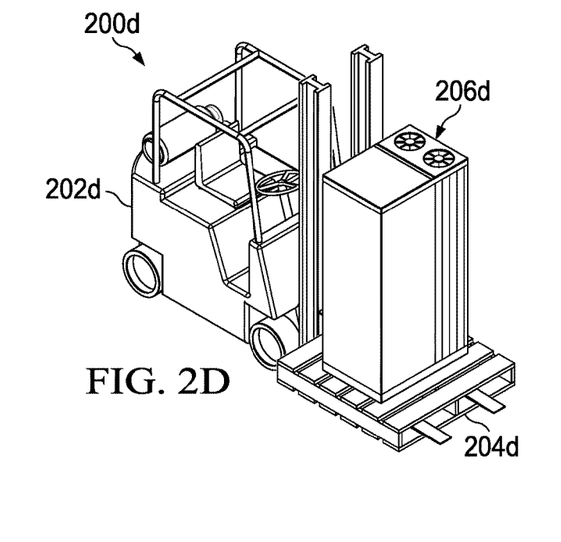

With regard to FIG. 1 is an illustration of an illustrative scene 100 in which a forklift 102 transporting a pallet 104 on which a load 106 including one or more objects is positioned. The load in this case is a set of barrels. For shipping and logistics purposes, volume of the load 106 may be measured. The load 106 may include one or more objects that are the same or different shapes. Each object of the load 106 may include a machine readable indicia, such as a barcode, disposed on the outside thereof.

With regard to FIGS. 2A-2D, an illustration of illustrative scenes 200a-200d are shown that include forklifts 202a-202d that are transporting pallets 204a-204d on which different sized and shaped loads 206a-206d (collectively 206) are positioned. The loads 206 include a variety of different shaped objects, including barrels 206a, small boxes 206b, large boxes 206c, and equipment 206d. It should be understood that the objects may be any sized and shaped objects that are typically transported on pallets, as understood in the art.

Figure 3:
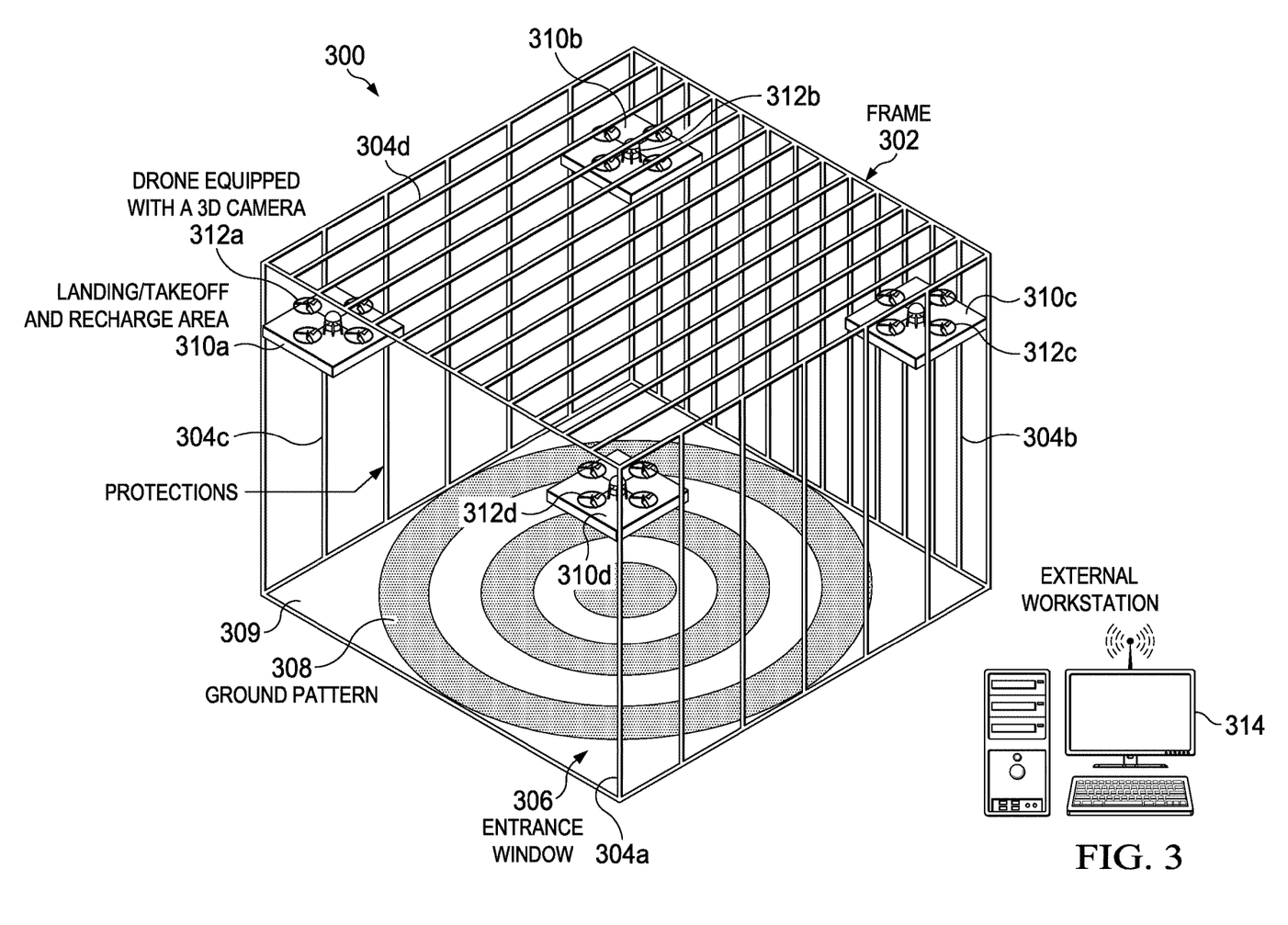
FIG. 3 is an illustration of an illustrative reading station in which pallets with loads may be positioned for an autonomous unmanned aerial vehicle (UAV) (e.g., drone) to measure volume dimensioning of the loads on the pallets is shown.

With regard to FIG. 3 is an illustration of an illustrative reading station 300 in which pallets with loads may be positioned for an autonomous unmanned aerial vehicle (UAV) (e.g., drone) to measure volume dimensioning of the loads on the pallets is shown. The reading station 300 is a defined area in which the loads may be positioned for measuring. The reading station 300 may be a room. In an embodiment, the measuring station 300 may include a frame 302 inclusive of a plurality of walls, such as three walls 304a, 304b, and 304c (collectively 304). The measuring station 300 may further include a ceiling 304d. An entrance window 306 may be defined by the frame 302 or portions of a wall (not shown) that a forklift or other vehicle may move a pallet with a load into and out of the measuring station 300. The entrance window 306 may be equipped with a safety sensor (e.g., optical sensor) that identifies when something or somebody crosses into the entrance window 306, which, if sensed, may cause measurement operations to be ceased. In an alternative embodiment, a safety barrier, such as a gate or arm, may be positioned to prevent something or someone cross into the entrance window 306, thereby preventing injury to an operator or damage to an object. In an embodiment, in response to a sensor (not shown) sensing that someone or something crossed into the entrance window 306, a sense signal may be generated and communicated to a computing device, such as workstation 314 (described hereinbelow), to cause the computing device to communicate a stop signal (or "go home" signal) to instruct the UAV to stop imaging by flying to a landing area.

In an embodiment, a ground pattern 308 may be disposed (e.g., painted, stamped, applied via an adhesive, etc.) on a floor 309 within the measuring station 300. The ground pattern 308 is shown to be a "bull's-eye," but other ground pattern may be utilized. In an embodiment, the ground pattern 308 may have particular dimensions that may be utilized as reference dimensions when determining dimensions of an object or orienting an imaging device, such as a UAV.

The measuring station 300 may further include one or more landing/takeoff and recharge areas 310a-310a (collectively 310) on which one or more UAVs 312a-312d (collectively 312) may be positioned while not being utilized to capture images of objects. The recharge areas may have electrical recharge capabilities for recharging the battery on the UAV(s) 312. If the batteries on the UAVs 312 are capable of 15 continuous minutes of flight for every hour of charge, for example, by maintaining at least four UAVs 312 within a measuring station 300, a 24×7 continuous operation of UAVs 312 may be possible, thereby providing no downtime for performing volume dimensioning of loads on pallets. In an embodiment, the recharge areas may be configured as one or more platforms. The recharge areas 310 may be configured with wireless recharge devices that are able to recharge a UAV wirelessly. Alternatively the recharge areas 310 may be contact chargers that match contacts on the UAVs 312.

In an environment, and external workstation 314 may be positioned outside of the measuring station 300, and be configured to receive communications from the UAV(s) 312 via wired or wireless communications network. The wireless communications network may utilize a local communications protocol, such as Wi-Fi®, or any other communications protocol (e.g., wide area network (WAN)), as understood in the art. The UAV(s) 312 may be configured to communicate images being captured by a camera on the UAV(s) 312 via the communications network. In an alternative embodiment, the communications network may be a wired communications network, such as a fiber optic or power over fiber or wire. However, while the use of wire increases security, wire may present more complications in terms of the UAVs flying around loads. In an embodiment, the communicated data may be encrypted to increase security.

With regard to FIGS. 4A-4E, illustrations that collectively show a process 400a-400e (collectively 400) for imaging a load in the reading station 300 of FIG. 3 by a UAV are shown.

Figure 4A:
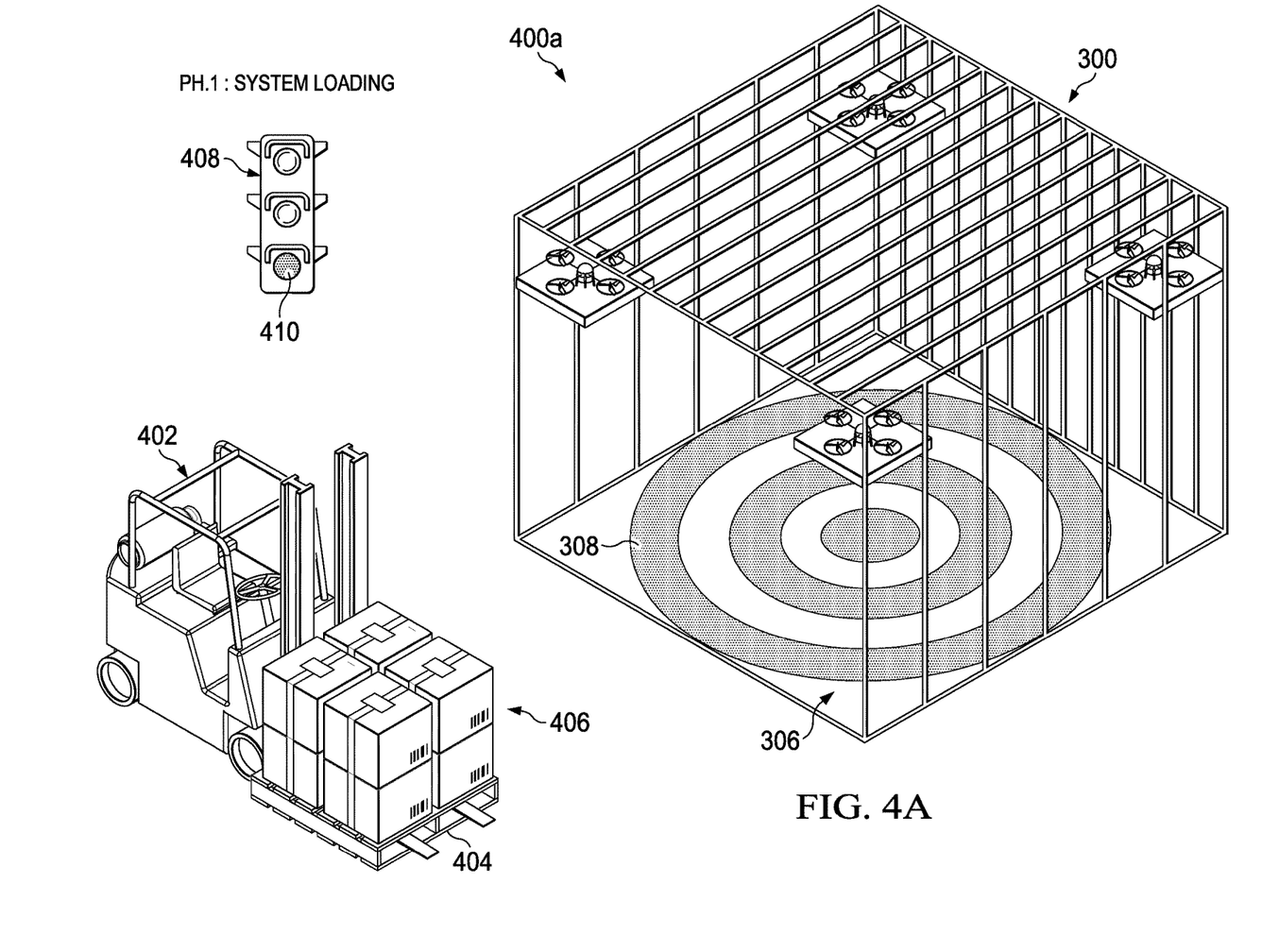
FIGS. 4A-4E are illustrations of the reading station of FIG. 3 that show a process for loading, reading, and unloading a pallet with a load to be read by the UAV.

As shown in FIG. 4A, a forklift 402 is shown to be moving a pallet 404 with a load 406 including multiple items toward the reading station 300. An indicator device 408, represented as a stoplight, is shown to be lighting a green light 410, which indicates that the reading station 300 is available for loading with the pallet 404 on which the load 406 is positioned. The indicator device 408 may additionally and/or alternatively include an audible indicator that is used to give notice to the operator of the status (e.g., available to enter, caution, do not enter) of the reading station 300. The forklift 402 may cross the entrance window 308 to place the pallet 404 on the ground pattern 308 for measuring by a UAV.

Figure 4B:
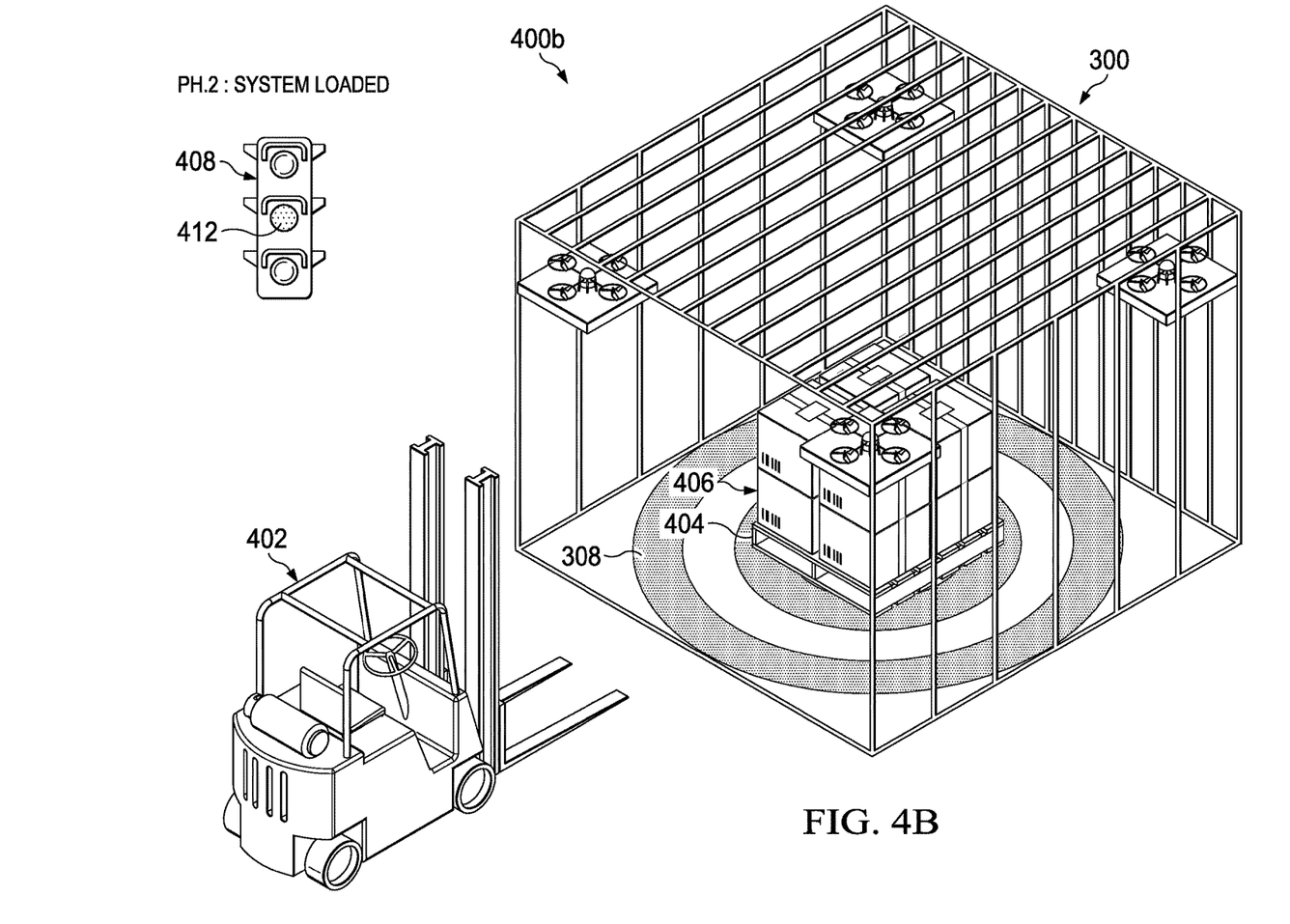

As shown in FIG. 4B, the pallet 404 with the load 406 is shown to be loaded in the reading station 300 with the forklift 402 backed out of the reading station 300. The reading station 300 at this point is loaded and ready to start a measuring phase. The indicator device 408 at this point has an indicator light 412, in this case a yellow light, turned on to notify an operator of the forklift 402 to go slow or otherwise be cautious as a measuring process is soon to begin.

Figure 4C:
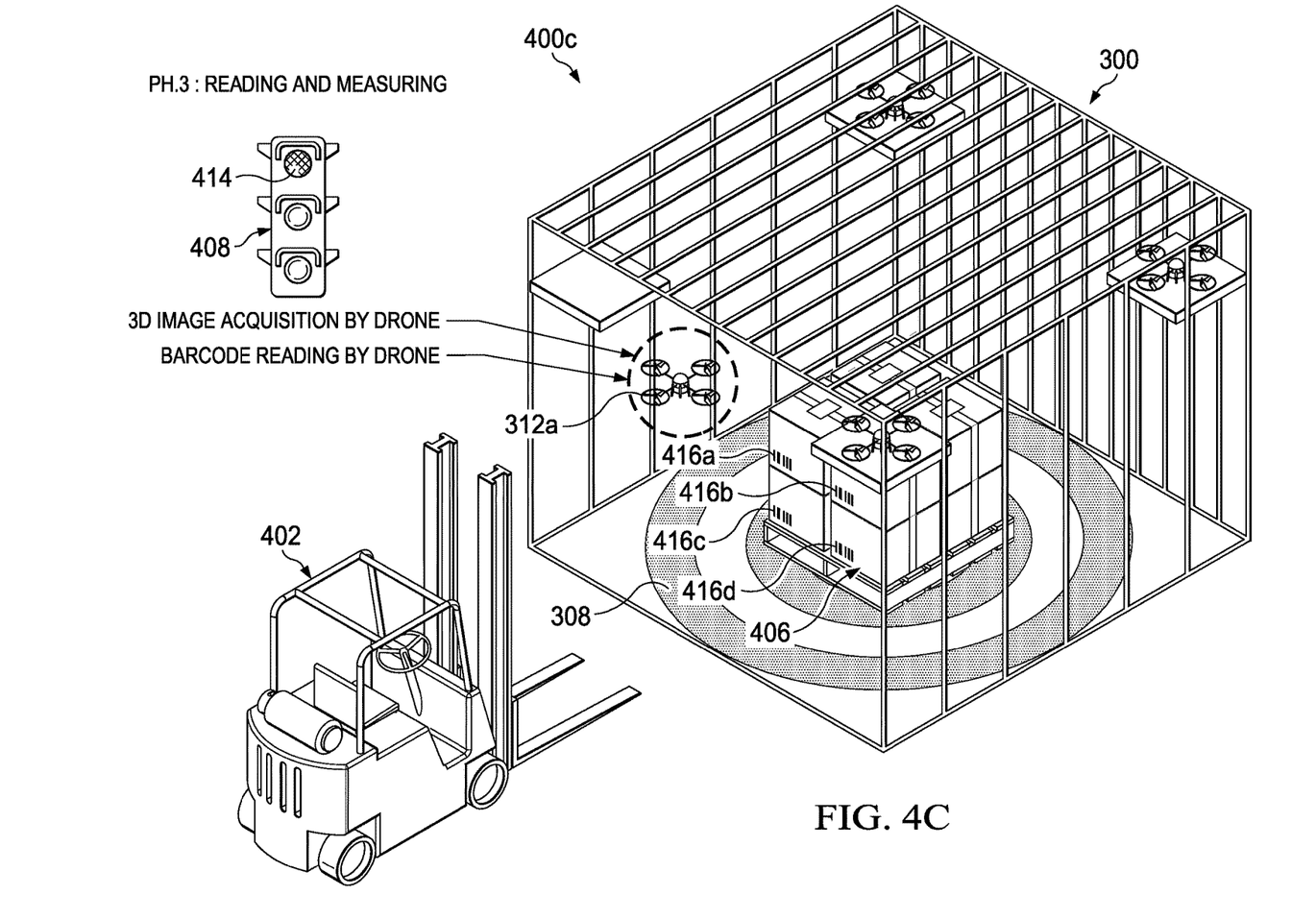

As shown in FIG. 4C, an active step 400c may enable the UAV 412a to perform reading of machine readable indicia (e.g., barcodes) 416a-416d (collectively 416) and volume measuring of a the load 406. While the UAV 412a is in operation, the indicator device 408 turn on an indicator light 414, in this case a red light, to notify the operator to not enter the reading station 300. As will further be described herein, to perform the reading and imaging, the appointed UAV or drone 312a may takeoff from a recharge area, localize and read a pallet identification barcode, which is today performed manually by a designed operator, may take 3D pictures or images of a scene (i.e., the load 406) and communicate the images to an external computing device (e.g., workstation outside the reading station) for a volume calculation to be performed and storage of the images.

Figure 4D:
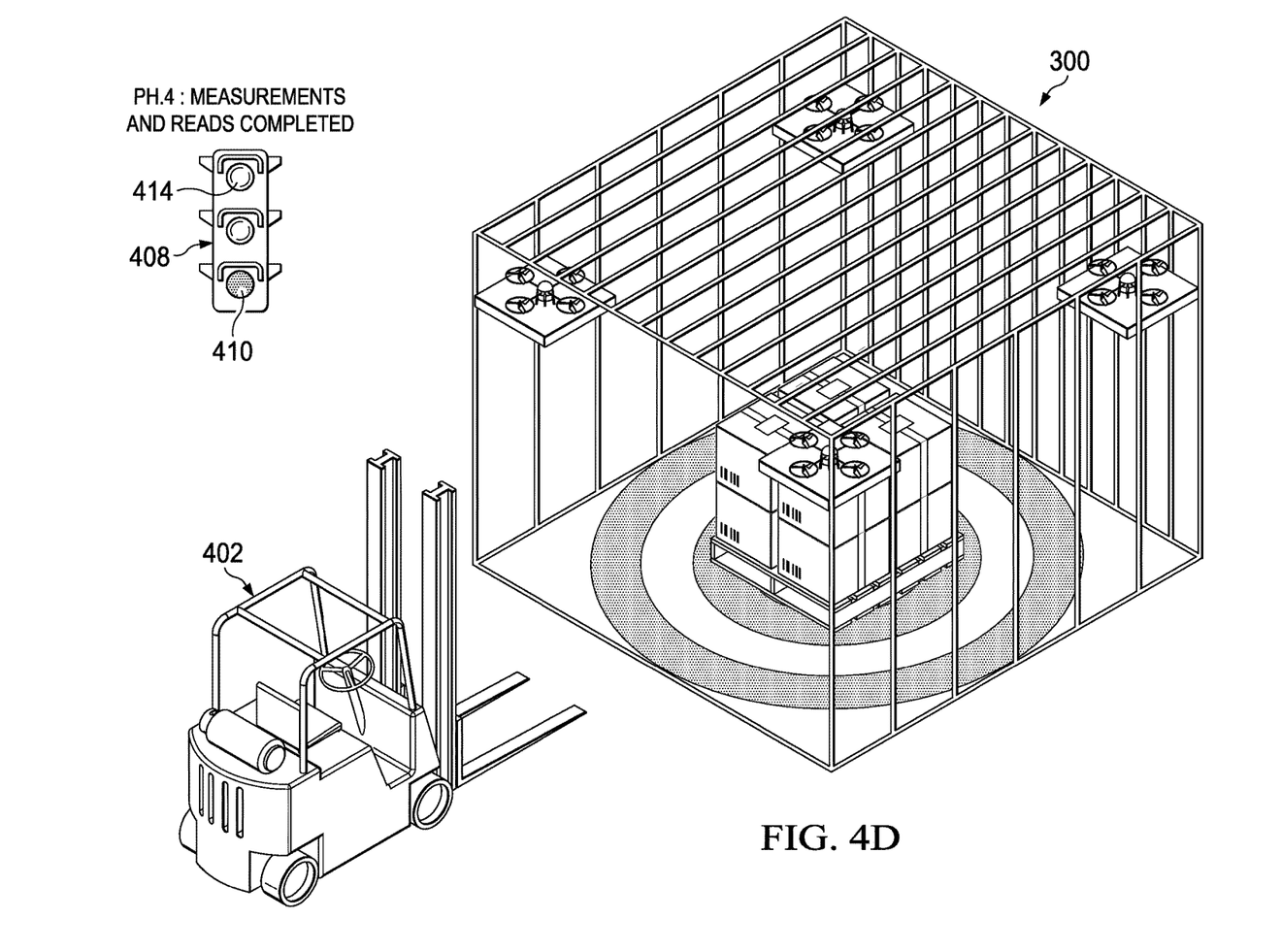

With regard to FIG. 4D, after the active phase is complete, the UAV 312a flies back and lands on the recharge area. The operator of the forklift 402 is enabled to enter inside the reading station 300 to remove the pallet 404 with the load 406. The indicator device 406 is shown to be illuminating the indicator light 410 to indicate to the operator of the forklift 402 that it is safe to enter the reading station 300.

Figure 4E:
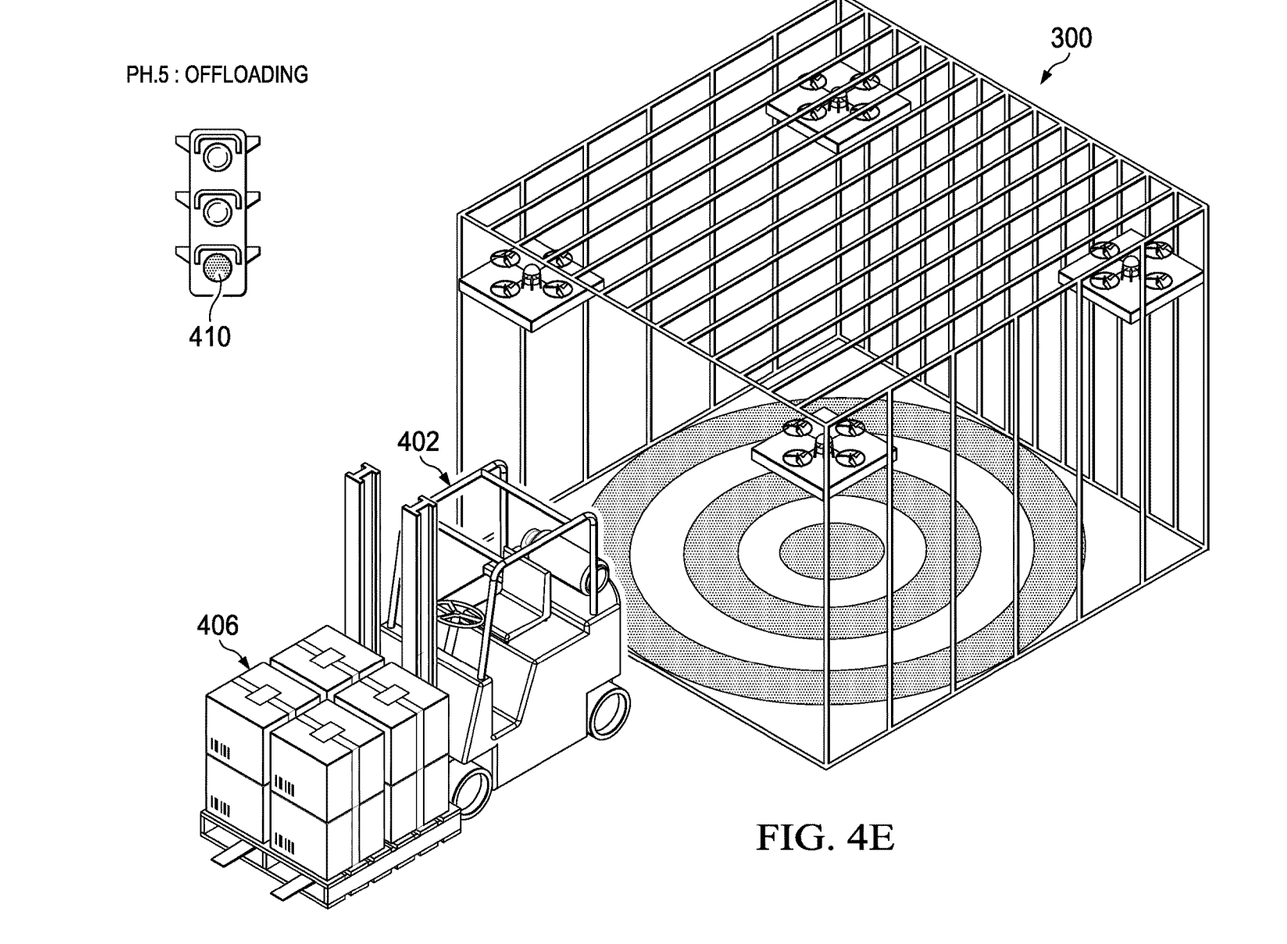

With regard to FIG. 4E, the forklift 402 with the already measured load 406 on the pallet 404 exits the reading station 300, and the indicator 406 turns on the indicator light 410, which is green, to notify the operator or another operator that the reading station 300 is ready to start another measurement task.

Figure 5A:
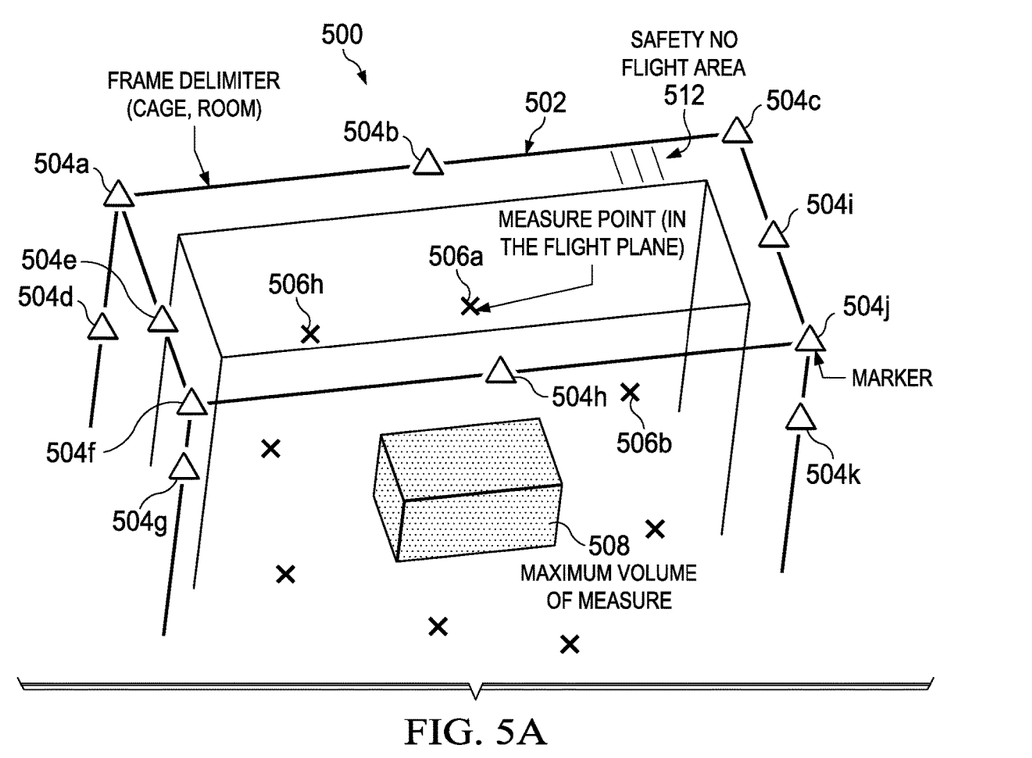
FIGS. 5A and 5B are illustrations of an illustrative reading station showing positions within which an autonomous unmanned aerial vehicle may be positioned during a training session and thereafter automatically position itself for measuring volume of objects on a pallet.
Figure 5B:
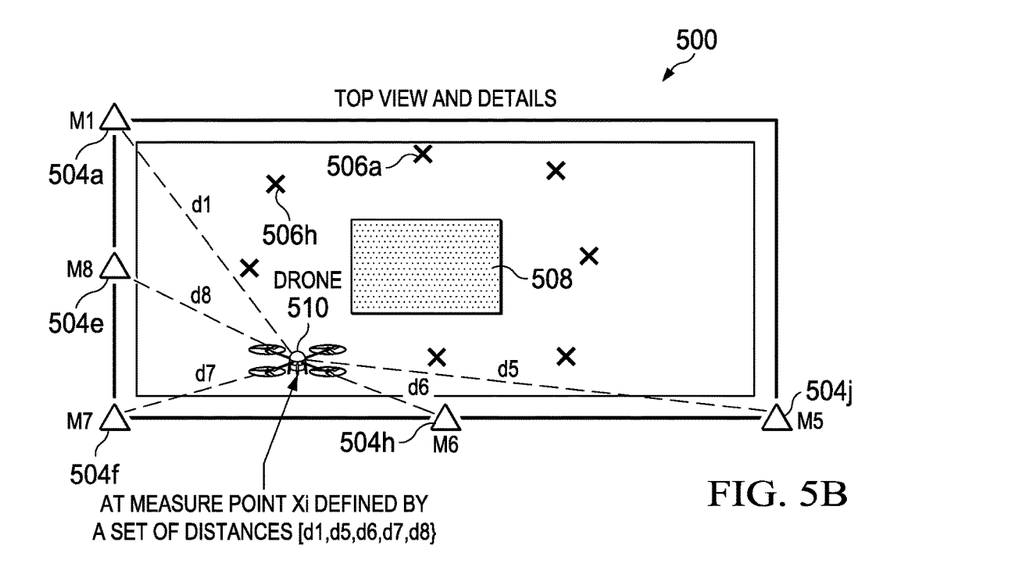

With regard to FIGS. 5A and 5B, illustrations of an illustrative reading station 500 in which an autonomous unmanned aerial vehicle may be trained during a training session and thereafter automatically position itself at measuring points for measuring volume of objects on a pallet are shown. The reading station 500 may include a frame 502, such as a cage or room, on which markers 504a-504k (collectively 504), such as illumination devices (e.g., LEDs or LED bars, RF antenna, fibre optic light, etc.), may be positioned to provide points of reference within the reading station 500. The markers 504 may alternatively be passive visual elements (e.g., painted crosses), but the use of active reference points (e.g., LEDs) allows for the reference points to be selectively turned on and off.

In an embodiment, a set of measuring points 506a-506h (collectively 506) may be defined around a maximum volume of measure 508 representative of a maximum sized load on a pallet that may be measured using an autonomous unmanned aerial vehicle 510. The use of the maximum volume of measure 508 prevents the UAV 510 from hitting a load during operations. The measuring points 506 may be positioned at substantially the same or different altitudes and substantially equal or different angular distances around a center point of the maximum volume of measure 508. A safe flight area 512 may also be specified that limits the UAV 510 from entering so as to provide an extra level of safety to people and objects that may be within the reading station 500 during operations. The UAV 510 may include one video system for navigation and one for 3D acquisition, although both functions may be performed by a single video capture system. The UAV 510 may also be configured with surveillance functionality (e.g., separate camera and/or sensor) that identifies and avoids humans.

In operation, an operator may train the UAV 510 to locate each of the measuring points 506. In the training, the UAV 510 may view a plurality of markers 504 using a measuring camera used to measure objects or a separate camera that is used for positioning purposes. The training may occur by the operator defining distances d1-dn of desired measuring points 506 that the UAV 510 is to fly to take measurements or the UAV 510 may measuring the distances d1-dn when an operator manually positions, via remote control, the UAV 510 at desired measuring points 506. It should be understood that the markers 504 may be positioned at additional and/or other locations (e.g., floor and/or ceiling) within the reading station 500. The camera may be a time-of-flight camera that is configured to measure distances from the UAV 510 to the markers 504. While determining the measuring points 506 in an accurate manner is helpful, it should be understood that precise location is not critical as the use of a 3D camera and/or other image processing techniques may provide for determining accurate volume dimensions if the UAV 510 captures the images from points that are not precisely at the measuring points 506.

In the training session, the operator may be able to define a flight path via each of the measuring points 506 that the UAV 510 is to fly while measuring a load. The training session may utilize a "reference parcel" of known measurements for calibration purposes. In an embodiment, the UAV 510 or remote workstation that may be configured to control the flight path may be configured to automatically determine flight path of one or more UAVs that are to be used within the reading station 500 to minimize distances. In particular, the flight plan may include of a set of measuring points 506 to be sequentially reached, where each of the measuring points 506 may be uniquely defined by distances d1-dn from the markers 504. At each of the measuring points 506, the drone may perform hovering while performing a 3D image acquisition. It should be understood that different measure points 506 are associated with a different set of distances and may utilize the same or different markers 504 in determining the distances that are used to define the measuring points 506.

Once the flight path is defined for the UAV 510, the UAV 510 may be able to autonomously navigate the "measuring area" via the measuring points 506 by relying solely on visual information of the markers 504 acquired by a camera (e.g., 3D camera) on the UAV 510. The flight plan may be stored in a memory of the UAV 510. As shown in FIG. 5B, the UAV 510 may measure five distances d1, d8, d7, d6, and d5 from five respective markers 504a, 504e, 504f, 504h, 504j to accurately measure the measuring point 506 at which the UAV 510 is to capture an image of the load being measured. It should be understood that more or fewer markers may be used to determine each measuring point 506. In an embodiment, a "real time flight plan" (RFP) may navigate the UAV 510 through the measure points 506, and be adaptable based on feedback from a remote computing device (e.g., workstation) that performs 3D reconstruction. In an embodiment, the UAV 510 may be configured with multiple communications channels, one for navigation and one for data communication. Feedback positioning in 3-dimensions (longitude, latitude, altitude) may be provided to the UAV 510 to reposition the UAV 510 and/or adjust a measuring point 506. As an example, feedback and control instructions may include, "30 cm closer and repeat the image acquisitions" or "add 2 measuring points in the flight plan and repeat the image acquisitions." It should be understood that the control signals may have alternative coding (e.g., X−30, Y+4, Z+2; RepAcq).

As a result of using the markers 504 that may be measured during flight by the UAV 510, high-end sensors and processing power that is common to UAVs for performing global positioning system (GPS) measurements, simultaneous localization and mapping (SLAM), or other positioning techniques and technologies, may be avoided, thereby reducing the cost and maintenance of the UAV 510. In capturing the images of the load, the images may be stored or not stored on the UAV 510, and if not stored, the images may be transmitted to the remote computing device for storage and processing thereby. By not storing the images, reduced weight and power usage on the UAV 510 may be achieved, and increased security may also be achieved as possible damage or theft of the images may be reduced.

Figure 6:
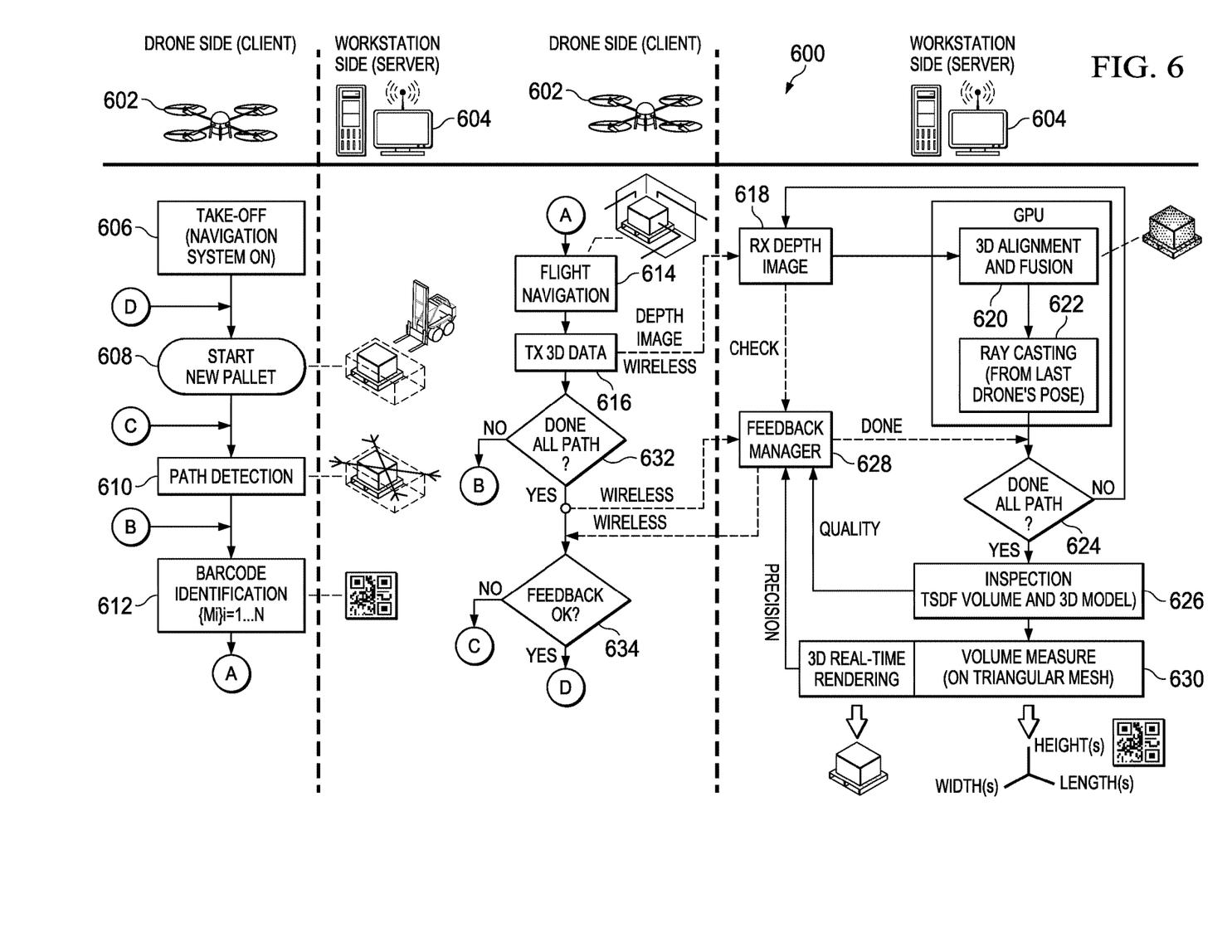
FIG. 6 is a flow diagram of an illustrative process for using an autonomous unmanned aerial vehicle measuring volume of objects on a pallet.

With regard to FIG. 6, a flow diagram of an illustrative process 600 for using an autonomous unmanned aerial vehicle measuring volume of objects on a pallet is shown. To employ the process 600, the process 600 is represented by two sides, a client side 602 (e.g., UAV) and a server side 604 (e.g., remote processing unit, such as a workstation). In an embodiment, a 3D vision camera on board the UAV may be configured to communicate wirelessly in real-time with an external workstation, for example. The UAV is considered to be on the client side 602, and the workstation may be a server on the server side.

The process 600 may start at step 606, where the UAV takes off, and at step 608 starts an on-board autonomous navigation system. At step 610, a path detection may be performed for autonomous navigation purposes. The path detection may be performed by detecting an extent of the reading station and plan a flight or navigation path. At step 612, barcode identification may be performed over each measuring point. In addition, other symbols, such as hazmat, may be captured and identified at each measuring point. At each measuring point, collected data, 2D and/or 3D, may be communicated the server perform barcode identification to assign the correct ID to the product perform. At step 614, flight navigation of the UAV may be performed by the UAV flying via each of the measuring points according to a flight plan, as previously described. At step 616, image data, such as 3D image data, may be communicated wirelessly to a remote processing unit for processing. The processing may be performed to determine volume dimensions, machine readable indicia information, and possible feedback for adjusting the flight path of the UAV, providing a location of missing data to the UAV, or providing other commands (e.g., scan again) to the UAV. If 2D images are captured, a 3D image may be generated using techniques, as understood in the art.

More specifically, in step 616, the server side 604 may perform the following steps. At step 618, a depth image may be received. Each received depth map may be aligned to the a current 3D model and fused using a KinectFusion-like framework at step 620. Multi-resolution Truncated Signed Distance Function (TSDF, a volumetric representation of a scene used for integration of multiple depth images coming from different viewpoints) extensions may be deployed for reduced memory footprint, as well as advanced tracking algorithms based on RGB-D, as understood in the art, and inertial measurement (IMU) data, if available. Moreover, at step 622, after each fusion, the model may raycast from the last estimate UAV's position, which provides an operator with instant feedback on the operation. Optionally, Marching Cubes can be performed on a TSDF volume to show an incremental 3D reconstruction. At step 624, a determination may be made as to whether the UAV has completed the flight path. If not, then the process may return to step 618. Alternatively if the flight path via the measuring points is complete, at step 626, the process 600 may perform automated as well as human inspections both on the final TSDF volume and on the 3D reconstruction. A quality measurement or other quality feedback may be communicated to a feedback manager at step 628. If any information is determined to be missing, both quality or precision, new data acquisition may be requested.

Volume dimensions measurements may be performed by integrating a triangular mesh along the ground plane at step 630. A 3D rendering may also be performed at step 630. At step 632 on the client side 602, a determination may be made as to whether all paths or measuring points have been performed. If not, then the process may be return to step 612 to perform indicia (e.g., barcode) identification. If so, then the process 600 may be passed to the feedback manager at step 628 on the server side 604, as previously described. In addition, on the client side 602, the process may continue to step 634, where a determination may be made as to whether the feedback does not have adjustment commands (i.e., readings are satisfactory) as received via a communications network from the feedback manager 628 of the server side 604. If not, then the process may return back to step 610 to perform path detection to position the UAV at a measuring point. Alternatively, if the feedback is indicative that the volume dimensions measurements are satisfactory, then the process 600 may restart reading a new pallet at step 608. Alternatively, the process may instruct the UAV to return to a recharging station while a new pallet is delivered to the measuring station.

Figure 7:
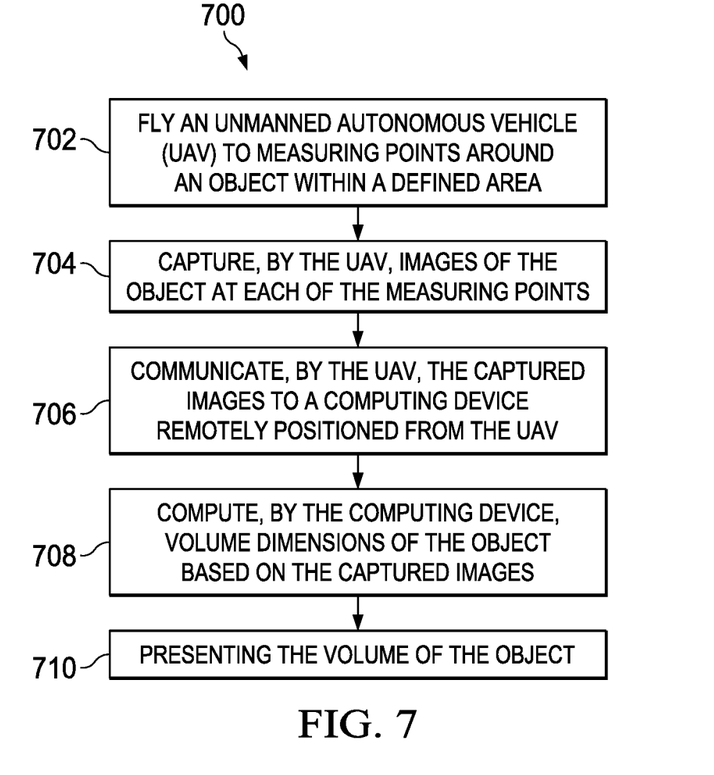
FIG. 7 is a flow diagram of another illustrative process for using an autonomous unmanned aerial vehicle measuring volume of objects on a pallet.

With regard to FIG. 7 is a flow diagram of another illustrative process 700 for using an autonomous unmanned aerial vehicle measuring volume of objects on a pallet. The process 700 may include flying a UAV to measuring points around an object within a defined area at step 702. At step 704, images of the object may be captured by the UAV at each of the measuring points. The captured images may be communicated by the UAV to a computing device remotely positioned from the UAV at step 706. Volume dimensions of the object may be computed based on the captured images at step 708. At step 710, the volume dimensions of the object may be presented. In presenting the volume dimensions, the volume dimensions may be presented to a user via an electronic display. Alternatively, the volume dimensions may be electronically presented to another system that uses the volume dimensions for logistics and/or shipping purposes.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be rearranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the principles of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The previous description is of a preferred embodiment for implementing the invention, and the scope of the invention should not necessarily be limited by this description. The scope of the present invention is instead defined by the following claims.

What is claimed:

1. A method for measuring volume dimensions of objects, the method comprising:
    defining a flight plan for an unmanned aerial vehicle (UAV) having one or more defined measuring points within a defined area;
    storing the flight plan in memory of the UAV;
    autonomously navigating UAV flying within the defined area to the defined measuring points along the flight plan around an object within the defined area including locating the defined measuring points based, at least in part, on determining distances by the UAV to a plurality of markers positioned at fixed locations within the defined area that are not on the object to provide points of reference for positioning the UAV within the defined area;
    capturing, by the UAV, images of the object at each of the defined measuring points;
    communicating, by the UAV, in real-time the captured images to a computing device remotely positioned from the UAV;
    computing, by the computing device, three-dimensional (3D) volume dimensions of the object based on the captured images including fusing and aligning the received captured images to a current 3D model;
    determining, during the computing by the computing device, missing data and communicating instructions to the UAV to capture additional images at locations determined to have the missing data;
    adapting, by the UAV, the flight plan in real time responsive to feedback received in the instructions received during flight from the computing device;
    presenting the volume dimensions of the object;
    sensing, by a safety sensor, that something or someone crosses an entrance window of the defined area; and
    in response to determining that something or someone crosses an entrance window of the defined area while the UAV is flying within the defined area, the computing device communicating a stop signal to the UAV to cause the UAV to stop imaging by flying to a landing area.

2. The method going to claim 1, wherein capturing the images includes capturing 3D images.

3. The method according to claim 1, further comprising establishing the defined measuring points during a training session based on distances from the plurality of markers positioned within the defined area.

4. The method according to claim 1, wherein flying the UAV to defined measuring points includes:
    viewing, by a camera on the UAV, a plurality of markers within the defined area;
    measuring, by the UAV, distances from the respective markers; and
    moving, by the UAV, position of the UAV until the UAV flies via each of the defined measuring points of the flight plan based solely on the measured distances from the respective markers.

5. The method according to claim 4, further comprising causing the markers to illuminate to enable the UAV to locate the defined measuring points by measuring the distances from the illuminated markers.

6. The method according to claim 1, further comprising:
    after capturing the images of the object, landing the UAV on a charger station within the defined area; and
    recharging a battery on the UAV by the charger station while the UAV is positioned on the charger station.

7. The method according to claim 6, further comprising:
    generating a notification prior to initiating flight of the UAV, the notification used to notify an operator to exit the defined area;
    after the notification is generated, flying the UAV around the object; and
    after flying the UAV to the charger station, generating a different notification signal to notify the operator that it is safe to enter the defined area.

8. The method according to claim 6, wherein the charger station is configured with wireless recharge devices for recharging the UAV wirelessly.

9. The method according to claim 1, wherein flying the UAV to each of the defined measuring points includes flying the UAV to the defined measuring points using the flight plan defining a sequence of the defined measuring points for the UAV to autonomously fly around an object while capturing the images.

10. The method according to claim 9, further comprising communicating, by the computing device, adjustments and/or additions to defined measuring points of the flight plan for capturing the images at the adjusted and/or additional defined measuring points responsive to the determination of missing data by the computing device.

11. The method according to claim 1, further comprising attempting to identify a machine readable indicia within a captured image at each of the defined measuring points and assign a correct ID to the object upon which the identified machine readable indicia is disposed.

12. The method according to claim 1, further comprising the 3D model being raycast from a last estimate of the UAV's position after each fusion of the captured images to the current 3D model.

13. The method according to claim 1, wherein the instructions communicated to the UAV from the computing device are provided in 3-dimensions of longitude, latitude, and altitude for feedback positioning to reposition the UAV or adjust a defined measuring point.

14. A method for measuring volume dimensions of objects, the method comprising:
defining a flight plan for a plurality of unmanned aerial vehicle (UAVs) having one or more defined measuring points within a defined area;
storing the flight plan in memory of the UAVs;
successively flying a plurality of UAVs within the defined area such that each UAV of the plurality captures images of an object while they are flying, and the UAVs of the plurality that are not flying are landed on a respective charging station to enable continuous operation of UAVs within the defined area;
autonomously navigating each respective UAV, while flying, within the defined area to the defined measuring points along the flight plan around the object within the defined area including locating the defined measuring points based, at least in part, on determining distances by the respective UAV to a plurality of markers positioned at fixed locations within the defined area that are not on the object to provide points of reference for positioning the respective UAV within the defined area;
capturing, by the respective UAV when flying, images of the object at each of the defined measuring points;
communicating, by the respective UAV, in real-time the captured images to a computing device remotely positioned from the UAV;
computing, by the computing device, three-dimensional (3D) volume dimensions of the object based on the captured images including fusing and aligning the received captured images to a current 3D model;
determining, during the computing by the computing device, missing data and communicating instructions to the respective UAV to capture additional images at locations determined to have the missing data;
adapting, by the respective UAV, the flight plan in real time responsive to feedback received in the instructions received during flight from the computing device; and
presenting the volume dimensions of the object.

15. A system for measuring volume dimensions of objects, the system comprising:
a defined area within which a load on a pallet is to be imaged for determining volume dimensions;
a computing device;
an autonomous unmanned aerial vehicle (UAV) including a (i) camera, (ii) processing unit, (iii) input/output (I/O) unit, and (iv) a memory, and configured to:
store a flight plan in the memory of the UAV having a sequence of the defined measuring points for flying the UAV around an object while capturing the images;
autonomously navigate the defined area by flying to defined measuring points according to the flight plan around an object within the defined area including the UAV locating the defined measuring points based, at least in part, on determining distances from the UAV to a plurality of markers positioned at fixed locations within the defined area that are not on the object to provide points of reference for positioning the UAV within the defined area;
capture images of the object using the camera at each of the defined measuring points;
communicate the captured images via the I/O unit to the computing device remotely positioned from the UAV; and
adapt the flight plan in real time responsive to feedback received during flight from the computing device,
wherein the computing device is configured to:
compute volume three-dimensional (3D) dimensions of the object based on the captured images including fusing and aligning the received captured images to a current 3D model;
determine missing data and communicate instructions to the UAV with adjustments to the defined measuring points of the flight plan for the UAV to capture additional images at locations determined to have the missing data; and
present the volume dimensions of the object; and
a sensor at an entrance window of the defined area configured to sense that something or someone crosses the entrance window of the defined area, and, in response to the computing device receiving a sense signal indicative that something or someone crosses the entrance window while the UAV is flying within the defined area, communicating a stop signal to the UAV to cause the UAV to stop imaging by flying to a landing area.

16. The system going to claim 15, wherein the camera of the UAV is a 3D camera configured to capture 3D images.

17. The system according to claim 15, wherein the defined area includes at least three walls.

18. The system according to claim 17, wherein the plurality of markers are positioned on fixed locations on at least one of a floor or a ceiling of the defined area.

19. The system according to claim 15, wherein the UAV, in flying to defined measuring points, is configured to:
view, by the camera, the plurality of markers within the defined area;
measure, by the processing unit, distances from the respective markers; and
move, via the flight path, position of the UAV until the UAV flies via each of the defined measuring points based on the measured distances from the respective markers.

20. The system according to claim 15, wherein the processing unit and camera of the UAV further are further configured to image a machine readable indicia associated with the object while flying around the object.

21. The system of claim 20, wherein the machine readable indicia includes at least one of a barcode, a QR code, a symbol, or text.

22. The system according to claim 15, wherein the plurality of markers positioned at fixed locations within the defined area are passive visual markers.

23. The system according to claim 15, wherein the plurality of markers positioned at fixed locations within the defined area are active visual markers configured to be selectively turned on and off.

24. The system according to claim 15, wherein the defined measuring points around the object are defined at different altitudes relative to each other.

25. The system according to claim 15, wherein the camera of the UAV may include at least one time-of-flight sensor configured to measure the distances to the plurality of markers.

26. The system according to claim 15, wherein the UAV further includes a first communication channel for navigation communication with the computing device, and a second communication channel for data communication with the computing device.

27. The system according to claim 15, wherein the plurality of markers include one or more LEDs, LED bars, RF antennas, fibre optic light sources, or passive visual elements.

28. The system according to claim 15, wherein the defined measuring points around the object are defined at different angular distances around a center point of a maximum volume of measure for the flight path.

* * * * *